United States Patent
Miranda et al.

(10) Patent No.: US 11,539,523 B1
(45) Date of Patent: Dec. 27, 2022

(54) DATA CREATION LIMITS

(71) Applicant: Wells Fargo Bank, N.A., San Francisco, CA (US)

(72) Inventors: Darius A. Miranda, San Francisco, CA (US); Rajiv Ranjan, Fremont, CA (US); Uma Meyyappan, Freemont, CA (US); Chris Theodore Kalaboukis, San Jose, CA (US); Joon Maeng, Newcastle, WA (US); Ramanathan Ramanathan, Bellevue, WA (US); Abhijit Rao, Irvine, CA (US); Abhijit Shetti, Pleasanton, CA (US); Rameshchandra Bhaskar Ketharaju, Hyderabad (IN); Chandramouli Subramanian, San Ramon, CA (US)

(73) Assignee: Wells Fargo Bank, N.A., San Francisco, CA (US)

(*) Notice: Subject to any disclaimer, the term of this patent is extended or adjusted under 35 U.S.C. 154(b) by 0 days.

(21) Appl. No.: 16/935,624

(22) Filed: Jul. 22, 2020

(51) Int. Cl.
| | |
|---|---|
| *H04L 29/06* | (2006.01) |
| *H04L 9/32* | (2006.01) |
| *H04L 9/06* | (2006.01) |
| *H04L 9/00* | (2022.01) |

(52) U.S. Cl.
CPC ............ *H04L 9/3213* (2013.01); *H04L 9/008* (2013.01); *H04L 9/0637* (2013.01); *H04L 9/3236* (2013.01); *H04L 9/50* (2022.05)

(58) Field of Classification Search
CPC ..... H04L 9/3213; H04L 9/008; H04L 9/0637; H04L 9/3236; H04L 2209/38
USPC ...................................................... 713/193
See application file for complete search history.

(56) References Cited

U.S. PATENT DOCUMENTS

| | | | |
|---|---|---|---|
| 7,673,315 B1* | 3/2010 | Wong | H04N 21/43622 |
| | | | 386/254 |
| 8,656,180 B2 | 2/2014 | Shablygin et al. | |
| 9,237,006 B2 | 1/2016 | Mattsson et al. | |
| 9,430,655 B1 | 8/2016 | Stockton et al. | |
| 9,936,526 B2 | 4/2018 | Edge | |
| 10,162,982 B2 | 12/2018 | De Oliveira et al. | |

(Continued)

OTHER PUBLICATIONS

Nash, Gerald, "The Anatomy of ERC721—Cryto Currently—Medium", [Online], Retrieved from the Internet: <URL: https://medium.com/crypto-currently/the-anatomy-of-erc721-e9db77abfc24>, (Dec. 23, 2017), 12 pgs.

*Primary Examiner* — Evans Desrosiers
(74) *Attorney, Agent, or Firm* — Schwegman Lundberg & Woessner, P.A.

(57) ABSTRACT

Systems and techniques for data creation limits are described herein. In an example, a data creation limits system is adapted to receive data and split the data into a plurality of portions based on entity interests in each of the plurality of portions. The data creation limits system may be further adapted to generate respective tokens for each portion of the plurality of portions. The data creation limits system may be further adapted to assign an owner to a token of the respective tokens, the token corresponding to a portion of the plurality of portions and assigning the owner based on the owner having an entity interest in creation of the portion. The data creation limits system may be further adapted to generate a script, using the token, for access to the portion. The data creation limits system may be further adapted to save the portion including the token.

19 Claims, 5 Drawing Sheets

(56) References Cited

U.S. PATENT DOCUMENTS

| | | |
|---|---|---|
| 2013/0132232 A1 | 5/2013 | Pestoni et al. |
| 2015/0149343 A1 | 5/2015 | Schwartz |
| 2017/0293912 A1 | 10/2017 | Furche et al. |
| 2018/0082291 A1* | 3/2018 | Allen .................. H04L 63/0428 |
| 2018/0082296 A1 | 3/2018 | Brashers |
| 2018/0234389 A1 | 8/2018 | Jain et al. |
| 2019/0097812 A1 | 3/2019 | Toth |
| 2019/0220836 A1 | 7/2019 | Caldwell |
| 2019/0318122 A1 | 10/2019 | Hockey et al. |
| 2019/0319944 A1 | 10/2019 | Kumar |
| 2019/0327082 A1 | 10/2019 | Ow et al. |
| 2019/0327272 A1 | 10/2019 | Narayanaswamy |

* cited by examiner

//ndDATA CREATION LIMITS

TECHNICAL FIELD

Embodiments described herein generally relate to creating and sharing data, specifically limiting access to the data to privileged parties when sharing.

BACKGROUND

Data, especially data about people and their habits, preferences, purchases, and activities, has become a commodity. The more information that is known about a person or a group of people, the better that marketing may be customized to that person and products or services developed to fit the needs of groups of people. Because this information is valuable, the person, and possibly the entity the person provided the information to, should have control of the information and be able to limit the access to the data.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
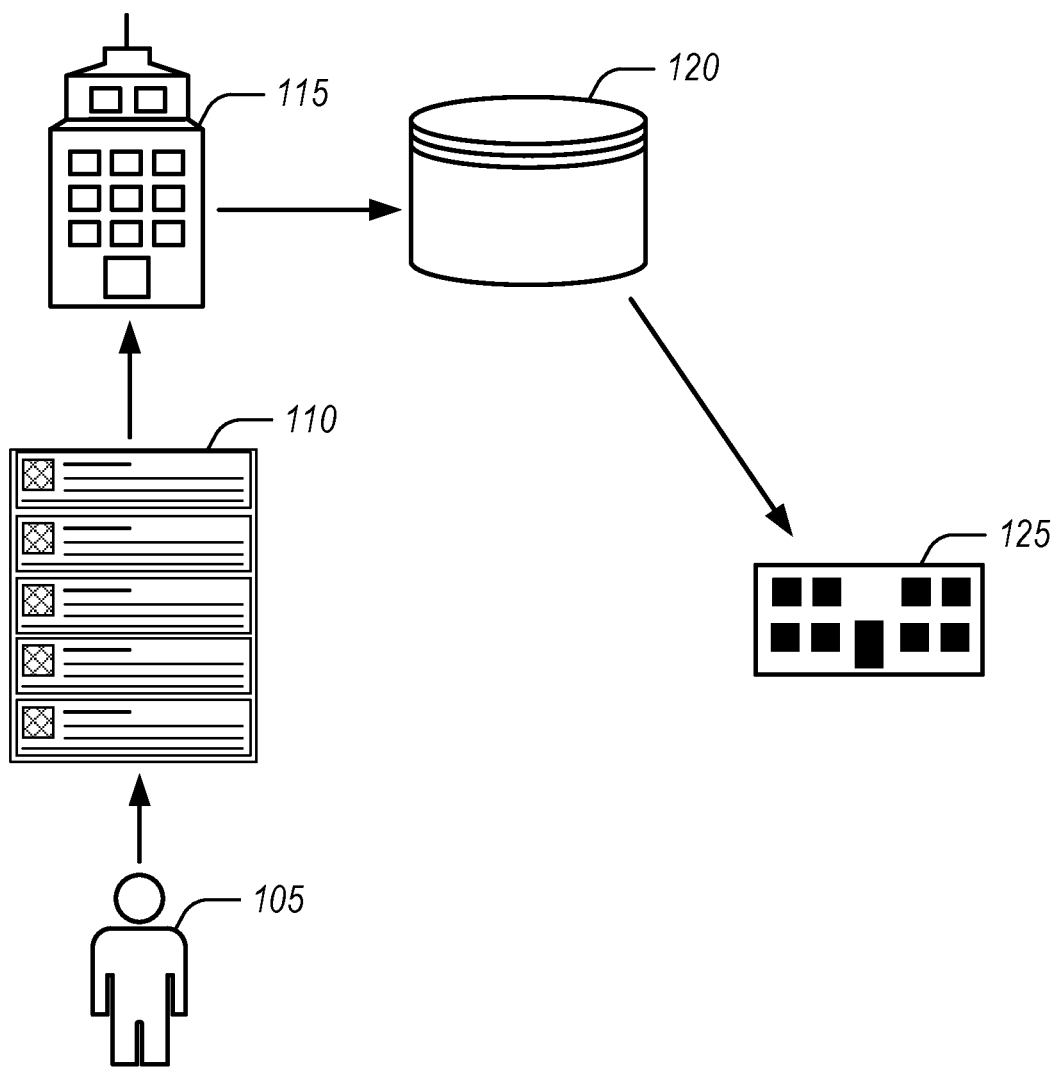
FIG. 1 is an illustration of data generation and sharing, in accordance with some embodiments.

Actions and interactions of a person may generate data about that person. This may include offline actions, such as purchases at a store. The store may use a loyalty system and record the items purchases by each person in the loyalty program. The person may pay for the purchase with a credit card, which provides the credit card company with information about the items purchased and where the person shops. Other types of offline data may include health or driving records.

A person may interact online, such as reading articles on different websites or making online purchases. Both of these may indicate the types of things that the person is interested in. A person may have social media accounts and the social media service may track the items the person clicks on or indicates a preference for such as with a "like" or by following the item. A person may use email or online chats which provide information about who the person interacts with and keyword searches may indicate topics and products of interests.

These are examples of the types of information which may be recorded about a person and may be monetized, as the data is a commodity for entities wanting to learn more about a person's actions and preferences. The actions and interactions of a person are used as an example of commodity data, but any type of data may be a commodity. The actions of businesses, both small and corporate, government entities, and health care providers are just some example of producers of data that may be a commodity.

An issue that many people are discovering, is that when a person produces data, such as making an online purchase, they no do not have any control of that data. For example, a person may purchase several items from an online retailer. The online retailer may then sell information about the items purchased by the person to an online marketer. The person does not receive any compensation for this sale of their information in addition to their possibly personal and private purchase information being exposed. In another example, a user of a social media platform may indicate their interests, from products to movies to sports teams. The social media platform may similarly sell this information, possibly without the person's consent or compensation.

The methods and techniques described herein construct data such that limits to sharing and access to the data is built into the structure of the data when it is created. These limits are then held with the data as it is stored, shared, accessed, and used over time. The methods and techniques described herein further disclose requesting and providing access to the data based on the limits. Including limits on data as it is created provides not only data privacy, but ensures that the data is owned and controlled by the originator of the data. This new kind of data structure uniquely provides security to the underlying data.

As the data is created, information is encapsulated with the data, including the owners of the data or the right to use the data, so that as the data may flow from different points or uses, the rights are enforced during the flow. The right to use the data may include monetization contracts to enforce the access control.

A user of a service may enter an agreement with the service about how data related to the user may be used. This may include levels of privacy or details about the user's actions. For example, the user may permit their data to be used in aggregated form, but not with any personally identifying information. The user may specify monetization or royalty requirements for using their generated data.

When data is created, it may start as unique, such as including unique identifiers of date, time, or location. Over time the data may become more categorized and less unique. From a different perspective, if data is overly secured, then it cannot be used. For example, an encrypted value of the data may be tied to a user identification or may be specific to a device, such that only the device with the encrypted value may be used to control access to the data.

Data may have multiple parties that want to control the data, such as the user and the social media platform as described above. The data may then be tokenized, or categorized, by who has an interest in the data. This may also split the data. For example, if Minka sends money to Gertie, then Minka has an interest in a portion of the data for the transaction, the bank that facilitates the transaction has an interest in a portion of the data, and Gertie has an interest in a portion of the data.

There may be parts of the data that is distinctly owned and some data that is mutually owned. The mutually owned data may be managed by each party of the mutual ownership. From the example, Gertie may own data related to the transaction and Gertie's personal information, but may not own Minka's personal data. The data of the transaction may be mutually owned by Minka, Gertie, and the bank.

When data is generated, such as for an interaction, there are many different portions of data that may be a part of the generated data, such as user provided data, metadata, transaction data (e.g., time, date, network information, etc.). Using the previous example, portions of data from the transaction may include, but are not limited to, the amount of the transaction, the time and date of the transaction, Minka's name and personal information, Gertie's name and personal information, Minka's account number and bank, Gertie's account number and bank, and the bank that facilitated the transaction. Each of these portions of the generated data may be assigned an owner or mutual owners.

A token may be generated for each portion of the data as a means for controlling the data. Each token may then be assigned an owner or mutual owner. For example, the portion of data for Gertie's account number and bank may be tokenized to secure the data and the token may be assigned an owner of Gertie and the bank.

FIG. 1 is an illustration of data generation and sharing, in accordance with some embodiments. A user 105 may generate data, such as when interacting with a social media page 110. The social media page 110 may be part of a social media platform 115 which collects the data generated by users of the social media platform 115. The social media platform 115 may sort, filter, and aggregate the generated data for storage in a data repository 120.

Third parties, such a marketing agency 125 may request data from the data repository 120. This may be general data, such as aggregated data that identifies the types of things people are interested in, or it may be personal data that identifies specific users or groups of users for direct marketing campaigns. The user 105 does not have any control of their personal data. As they have interacted with the social media page 110, the generated data has been collected by the social media platform 115 and the user 105 cannot manage who has access to the data, nor receive any compensation for the data.

Figure 2:
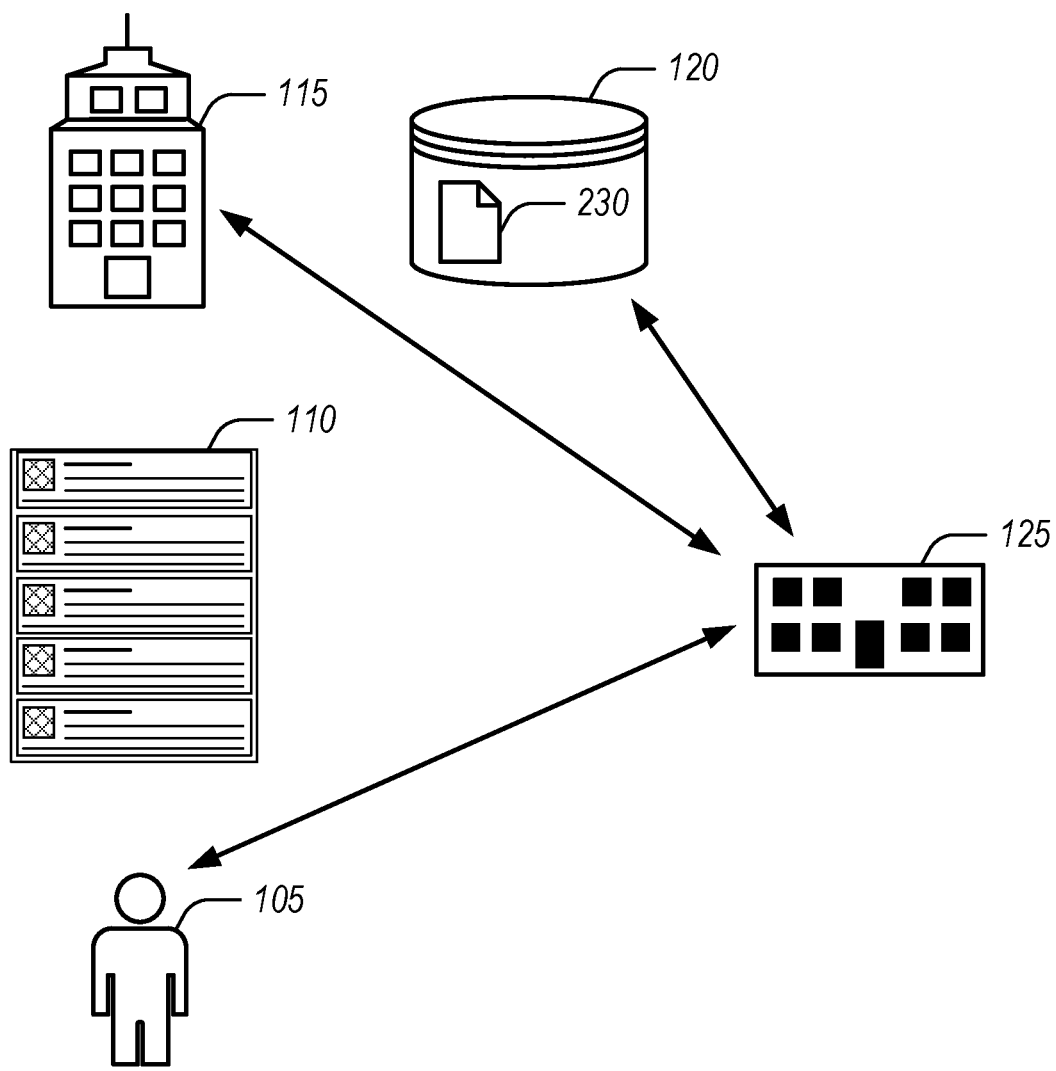
FIG. 2 is an illustration of data generation sharing with usage limits, in accordance with some embodiments.

FIG. 2 is an illustration of data generation sharing with usage limits, in accordance with some embodiments. The marketing agency 125 may attempt to get data from the data repository 120. The data in the data repository 120 may include a contract 230 for each data portion stored within. The contract 230 may be a set of rules or limits for accessing and using the data portion, which may include information about the owners of the data portion.

The data that was generated from user 105 interacting with the social media page 110 may be owned by both the user 105 and the social media platform 115 based on the user agreement between the social media platform 115 and the user 105. The contract 230 may direct the marketing agency 125 to contact the social media platform 115 and the user 105 to access the data in the repository 120. The marketing agency 125 may be required to be granted permission by both the user 105 and the social media platform 115. The user agreement may give the social media platform 115 permission to grant access to certain data on behalf of the user 105 (e.g., interests may be exposed, but personal contact information may not be exposed).

The contract 230 may direct the marketing agency 125 to contact the social media platform 115 for permission. The social media platform 115 may contact the user 105 directly for permission based on the user agreement, so as not to expose any user information to the marketing agency 125. The social media platform 115 may send a bulk permission request (e.g., multiple permission requests) at one time to the user 105 to reduce the number of permission requests the user 105 receives.

Once the social media platform 115 and, if required, the user 105, grant permission to access the data portion in the repository 120, the marketing agency 125 may receive a private key to access the encrypted data. The marketing agency 125 may receive a token that redirects the marketing agency 125 to the actual data.

An entity, which may have data to share or sell, such as the social media platform or online retailer, may provide a search component for entities that wish to access the data. The search component may sort the data based on the portions saved with different tokens. For example, the online retailer may store purchase data. The search may query for purchases of televisions. The search may return data based on the portions of data saved with tokens which identify the data has a purchase of a television.

The search may query if the data is available and if the data exists. Each of these aspects are important as identifying if the data exists provides the querying entity with information of whether there is data to be procured or not. The availability may identify different levels of data that may or may not be accessible to the querying entity, along with any possible compensation for accessing the data. Using the online retailer and television purchases example, a query may return that television purchase data exists. The query may return the availability of data, such as the data portion for items that were purchased with the television is freely accessible, data portion for general demographic information about the purchaser is accessible for cost, and the data portion of purchaser identification and contact information is not accessible.

A search query may be a distributed query where multiple repositories of data are queried at one time. Each repository may return whether the data exists. Based on the existence of data for each repository, a second directed query may be performed for the availability of the data.

A blockchain may be used by multiple sources to store the tokenized data. This may reduce the need for querying multiple sources and instead perform a single query of the blockchain. The blockchain may provide for data, or the tokens for data, to be stored in one place but with different permissions. The tokens stored in the blockchain may direct to a different storage location for accessing the tokenized data. When access to the data is requested, the requester's permissions may be matched to portions of data that the requester has a token for.

A blockchain uses a decentralized, distributed, and synchronized digital ledger to record data across computers. The ledger may be public or private, but is known to all the parties of the corresponding blockchain's network. Through the use of the ledger, the data records may not be altered retroactively. As the ledger is decentralized and distributed, a single rogue retroactive alteration is prevented as the alteration will not appear in the other distributed copies of the ledger. Additionally, the distribution prevents the ledger from being held hostage by a hostile entity, unlike content such as bank records, which may be housed in a centralized data storage facility that may allow a hostile entity to assume complete control of the bank records. Because the ledger may not be retroactively altered, it allows participants to securely store data and transactions which may be verified and audited inexpensively.

A blockchain may be managed by a peer-to-peer computer network which adheres to a set of protocols and is responsible for generating new blocks. Each block contains a set of data records. The term blockchain is based on the idea that each block is linked to the blocks before it through the use of a hash. Each block includes a cryptographic hash of the previous block, and thus the cryptographic hash of one block is dependent on all the blocks that came before it. As each hash is dependent upon the one that came before it, if a block is altered anywhere in the chain, then the hash would be altered for every block that came after it. Herein lies the immutable security of blockchain, as any rogue alteration to a block will alter all the subsequent blocks and thus be detectable by the other systems in the blockchain network.

Part of the security of blockchain is that each new block is found, or mined. As a new set of data needs verification and addition to the blockchain, the data is bundled into a block. To add the block to the blockchain, miners must solve complex mathematical equations that are a result of the encryption protecting data on a blockchain network. The miner who solves the complex mathematical equations may receive a reward, and thus the incentive for finding the next block. In the process of finding the next block, it validates a block of transactions.

Figure 3:
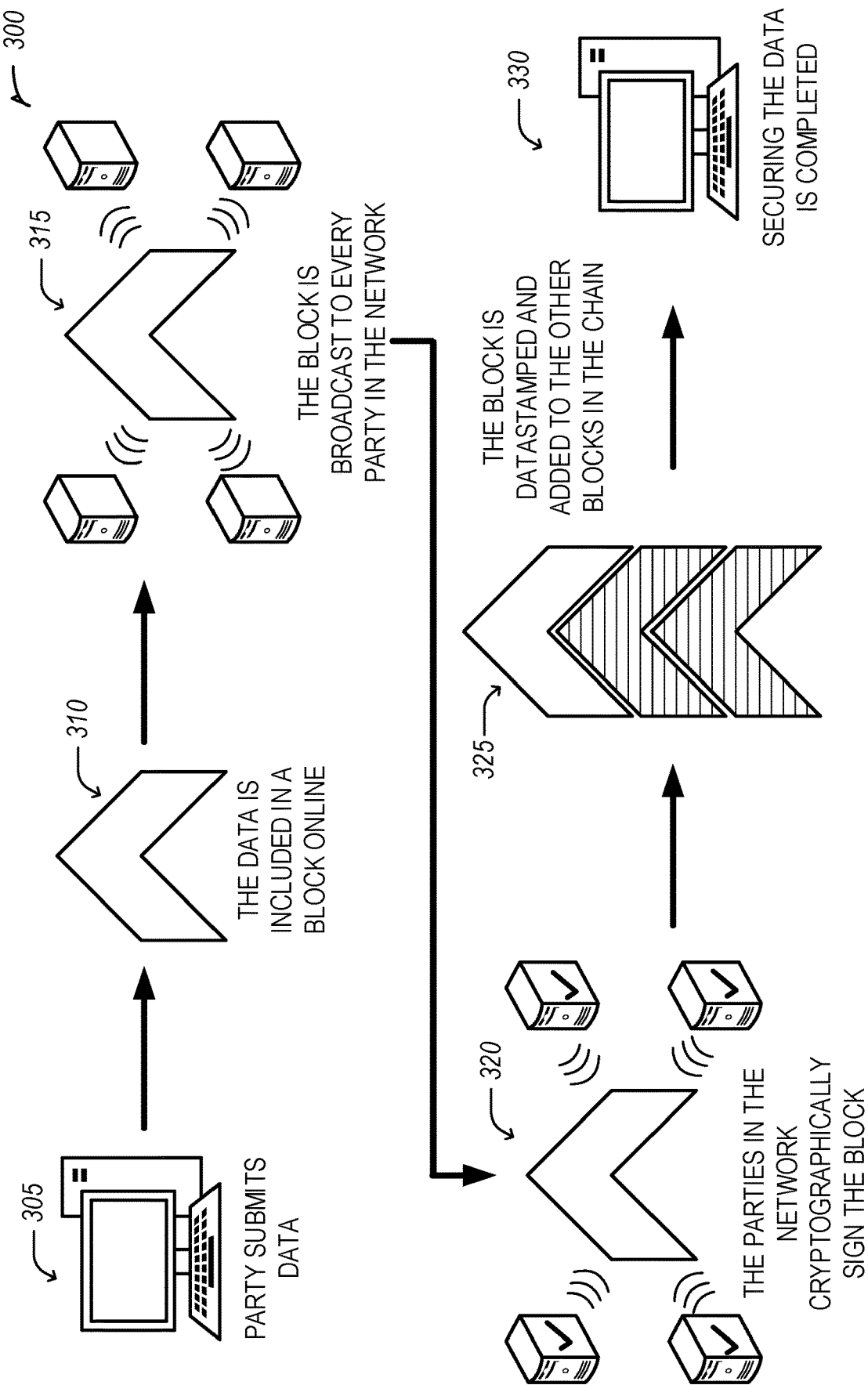
FIG. 3 illustrates an example of securing data in a blockchain, in accordance with some embodiments.

FIG. 3 illustrates an example of securing data in a blockchain 300, in accordance with some embodiments. To insert data to a blockchain, at step 305 a party submits the data using a computing device connected to a network. At step 310, the data is included in a block online. At step 315, the block is broadcast to every party in the blockchain network, the network may be a public network or the network may be a private network of known entities. The parties in the network are the parties that contribute and maintain the distributed blockchain. Through the broadcast, each party receives the block. At step 320, the parties in the network cryptographically sign the block. The block is validated to be added to the blockchain. At step 325, the block is data stamped and added to the other blocks in the blockchain. Through the use of the hash, the block is now linked to the other blocks in the blockchain and may not be altered. At step 330, the securing the data in the blockchain is completed and the data is now an immutable part of the blockchain.

The persistent record for digital content inherent in an internal blockchain system provides maintenance of those digital content items should the unforeseen occur. The distributed nature of the blockchain removes a single point of failure, such as with a centralized database. Should one of the networked computer systems in the blockchain go down or become inaccessible, the digital content items of the blockchain is still accessible from any of the other computer systems in the network.

When data is created, a set of auto-generated rules may be used for splitting the data into portions. This may be based on the sensitivity or security of the data, such as bank account numbers require high security. The auto-generated rules may be based on accessibility or permissions provided by a user. For example, when a user joins a social media platform, the user may specify the information that may be shared, such as permitting the sharing of interactions on the social media platform and the user's location and age, but not permitting the sharing of their identity, gender, and contact information. Based on these permissions, a set of auto-generated rules may be generated for data created from the user's interactions. The user may permit requests for their personal information. This may generate a rule where the user's personal information is not accessible though the social media platform, but a direct request to the user is permitted.

The generated rules may be based on standards, such as standards for an industry or data type standards for identity. For example, the bank industry may have standards for protecting account information or the government may have standards for protecting social security or tax information. Instead of holding a rule with the data portion, the data portion may include an identifier for the type of data or the rule type which refers back to a rule or standard stored in a database. The stored rule or standard is then retrieved when data access is requested.

The rules may be used to section the data into the data portions when the data is created. The rules may include how the data may be used. For example, a portion of data may be identified as one of freely available upon request, available for a fee, or inaccessible. The data portions may have self-managed keys, where a private key is managed in the data portion with the public key being generally available.

Sharing rules may be based on context, such as the requester or the intended use of the data. For example, if the user is requesting access to their own data, such as from a transaction, the user may have full access to the data as they created it. In another example, aggregated data for sale may have less strict rules as the data has been aggregated to remove any personal or identifying information. A context of a data portion that is wholly owned by one entity may result in no rules for the entity. For example, a bank owns transaction metadata, thus may sell this data without requiring permission from sender or receiver.

A portion of data may have multiple owners and thus may require receiving permission to access the data portion from each identified owner. Each owner may have different rules for accessing the data. For example, the owners of user interaction data on a social media platform may include the social media platform and the user. The social media platform may make the data available upon request where instead the user requires a fee. The data requester may only access the data, or receive the token for the data, when both the request has been granted by the social media platform and the fee is paid to the user. The limits of the data portion may include multiple contracts for the multiple owners. For example, using the context of the request, a check may be performed with each owner's contract to identify if the data portion may be accessed.

Access to data portions and identifying the owners of the data portion may be considered identity and access management. A blockchain may be used for identity management as a means for verifying the entities requesting and granting access to data. For example, a trusted authority may issue a personal credential for an identity owner. The trusted authority is attesting to the validity of the personal data in the credential. The credential, and data in the credential, may be stored in the blockchain. When a user then presents their identity, through the blockchain, the proof of their identity in the credential is based on validating the signature of the trusted authority and not the needing to verify the actual data itself. Because of the immutable nature of data stored in a blockchain, the validity of the credential is self-validating.

The methods and techniques described herein for limits on the creation of data may have the identity information for a data portion stored in a blockchain. This may include a chain of identity and multiple entity identities for a data portion. Storing the data portion with identity information in a blockchain may prevent the identity information from being altered. As discussed in previous examples, a social media platform may sell user data. It may be difficult for a user to track their data and over time, either for accidental or nefarious reasons, the user identity may become disassociated with the data. Storing the data portions in a blockchain may prevent the user identity information from becoming disassociated with the data portions as data stored in a blockchain cannot be altered.

The identity data for a data portion may evolve over time. Identities may be added of other users that interact with the data, such as modifying or providing a value add to the data. For example, the data is for a purchase of a product from an online retailer. Should the purchaser recommend the product to a friend, who then also purchases the product, this generates additional data tied to the purchase data and includes the friend as a new owner of a portion of the data. Using a blockchain with this scenario, a new blockchain entry may be created that links to the original purchase data entry. The original purchase data is therefore unaltered and ensuring the purchaser's identity remains intact with the new data for the friend also being made available.

As the identity data evolves, the data portion may have further restrictions added. For example, when a bank and a user have interests in a data portion, and a sub-group in the bank adds new rules to the data portion (e.g., a litigation hold), then this adds a restriction, but does not remove the bank's or user's restrictions.

The controls, rules, limits, permissions, and contracts for a data portion may be self-regulating through the use of a script that is encapsulated with the data portion. The script may be used to enforce the controls and permissions as the data portion flows. As the data portion may move from one platform to another, the script is executed and enforces the limits for the data portion. The script may direct the data requester to the corresponding data authorities for gaining access to the data.

A data owner may not want to be contacted every time a request is made for a data portion. Instead, the script may automate data portion access. The script may verify the requester had a valid level of access, such as from previously purchasing data access from a data provider. The script automation may utilize a blockchain. As previously discussed, the blockchain may include verified identities. The script of a data portion may execute when an access attempt is made by a requester. The requester may provide a credential for accessing the data portion. The script may then use the block chain to verify the credential through attestation without having to perform a validation of the credential.

The data, or a data portion, may be encrypted when stored. When a request for the data is made, the script may determine access privileges and which owners of the data portion may be required to provide authorization to access. The owners of the data portion may provide the private key for the encryption of the data. The private key may be stored at a storage location agnostic to the owners. For example, when a data portion has multiple owners, the script may request permission from each of the owners. Upon receiving authorization from each of the owners, the script may then retrieve the private key from the storage location. The storage location for the private key may only be known to the script for the data portion. This may prevent a single owner from providing the private key, and thus access, without also receiving the authorization from the other owners.

The data portion may be encrypted with a homomorphic encryption. Homomorphic encryption allows for data to remain encrypted while it is processed or manipulated. It may enable a party to apply functions to the encrypted data without revealing the values of the data. For example, a party may request may a data portion and the owner may grant the request. However, the data portion may be homomorphically encrypted such that the data is released to the party, but remains encrypted. The party may still perform functions and manipulations with the data, but as the data remains encrypted, this may prevent the party from sending the data to other parties that have not made an request or been authorized for access.

In an example, one or more of the data portions may be stored using a homomorphic encryption technique. Homomorphic encryption allows for searching or other operations on encrypted files, bits, or data portions that match results (when decrypted) as they would be performed on the unencrypted version of the files, bits, or data portions. For example, consider a data portion and a search term that, when searched unencrypted, results in the data portion being identified. When the data portion stored is using a homomorphic encryption technique, and the search term is encrypted using the same homomorphic encryption technique, the encrypted search term, when searched encrypted, identifies the encrypted data portion. This may help identify that the data, or data portion, that is desired (searched for) is available, but not revealing the actual data held within the encrypted data portion.

Figure 4:
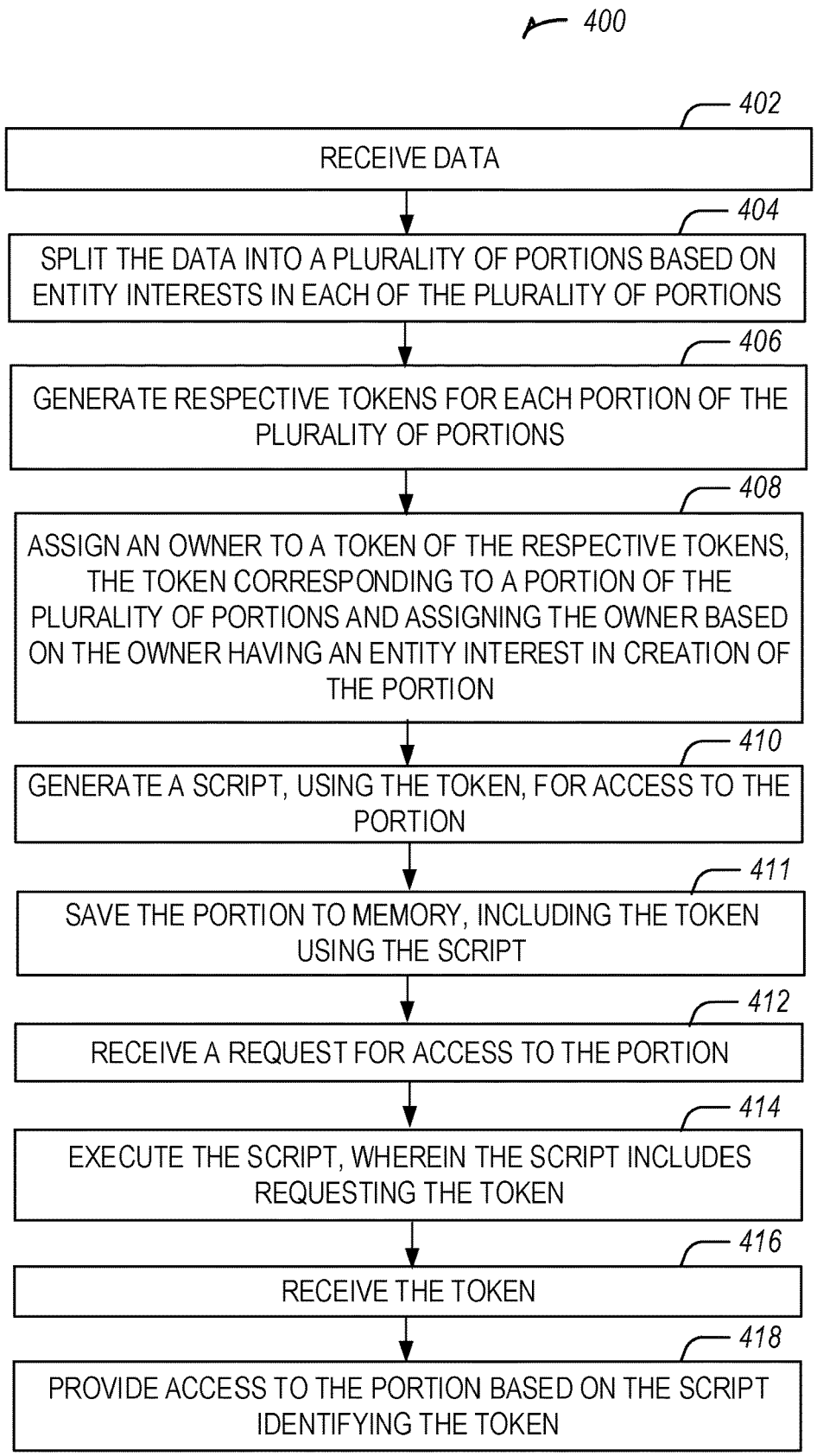
FIG. 4 illustrates a flow diagram of an example of a technique for data creation limits, according to an embodiment.

FIG. 4 illustrates a flow diagram of an example of a technique 400 for data creation limits, according to an embodiment. The technique 400 includes an operation 402 to receive data. The data received may be any type of data. As previously discussed, the data may be personal data that has been generated by online activities, such as interacting on a social media platform or making an online purchase. The data may be other forms of personal data, such as health or tax information. The data may not be for an individual, but for a group of people or for an organization, such as a company or philanthropic group.

The technique 400 includes an operation 404 to split the data into a plurality of portions. Splitting the data into the plurality of portions may be based on entity interests in each of the plurality of portions. Splitting the data into the plurality of portions may be based on a set of rules. The set of rules may indicate splitting the data based on ownership. For example, a transaction may have multiple participants, but each participant may own certain portions of the transaction data, but not all of the transaction data. The set of rules may indicate splitting the data based on permission. Similar to ownership, the permission may be based on who is permitted to access the data. For example, with a transaction, the recipient may not have permission for the account number of the sender. Rules may be based on other factors, such as industry standards and data aggregation.

The technique 400 includes an operation 406 to generate respective tokens for each portion of the plurality of portions. A token may be used to correspond to the data portion so that the actual information in the data portion is not exposed. The plurality of portions may be encrypted with a homomorphic encryption. The plurality of portions may be stored in a blockchain. The plurality of portions may be stored as a data structure including the data, the script, and the token. The blockchain may provide a distributed and immutable structure so that the data portions may not be altered, which includes the rules and owner information for accessing the data portion. The plurality of portions may be encrypted with a hash of the blockchain.

The technique 400 includes an operation 408 to assign an owner to a token of the respective tokens. Each token corresponding to a portion of the plurality of portions. The owner may be assigned based on the owner having an entity interest in creation of the portion. A portion may have a second owner. When a portion has a second owner, the second owner may be assigned a second token, where the second token also corresponds to the portion of the plurality of portions. Thus, if a portion has a multiple owners, the portion may have multiple tokens, where each token is assigned to an owner.

The technique 400 includes an operation 410 to generate a script, using the token, for access to the portion. The script may include information about the owner and how a requester may access the data portion. The script may indicate that the portion may be accessed by providing the token. If the data portion has two owners, then the operation may generate the script for access to the portion, with access to the portion being based on the script identifying the both the token and the second token. The technique 400 includes an operation 411 to save the portion to memory, including the token using the script.

The technique 400 may include an optional operation 412 to receive a request for access to the portion. The technique 400 may include an optional operation 414 to execute the script. The script is executed based on receiving the request for access. The script includes requesting the token. The execution of the script may identify additional requirements for the requester, such as paying a fee or providing additional information about the requester or the intended use of the data. If the data portion has two owners, when the script is executed, the script may include requesting the token and the second token.

The technique 400 may include an optional operation 416 to receive the token. For example, the owner may provide the token to indicate that they are granting access to the requester. If the data portion has two owners, the operation may receive the token and the second token, as both the owner and the second owner may provide their respective tokens to indicate granting access to the data portion.

The technique 400 may include an optional operation 418 to provide access to the portion based on the script identifying the token. If the data portion has two owners, the operation may provide access to the portion based on the script identifying the token and the second token. When the required number of tokens and other requirements indicated in the script are met, the requester may receive access to the data portion The technique 400 may further include an operation to receive a request for verification of existence of the portion. A requester may first request verification of the existence of data before making a request. The technique 400 may further include an operation to provide a verification response for the portion. The technique 400 may further include an operation to receive a request for availability of the portion. Based on receiving the verification of the existence, the requester may then request the availability. This may be based on the owners or permissions for accessing the data. There may be restrictions on the type of entity that may access the data. For example, a data may not be exposed to political campaigns. The technique 400 may further include an operation to provide an availability response for the portion. The availability may be based on requirements of the script, such as receiving permission from the owners, the access rights of those that may get access to the portion, or paying a fee.

Figure 5:
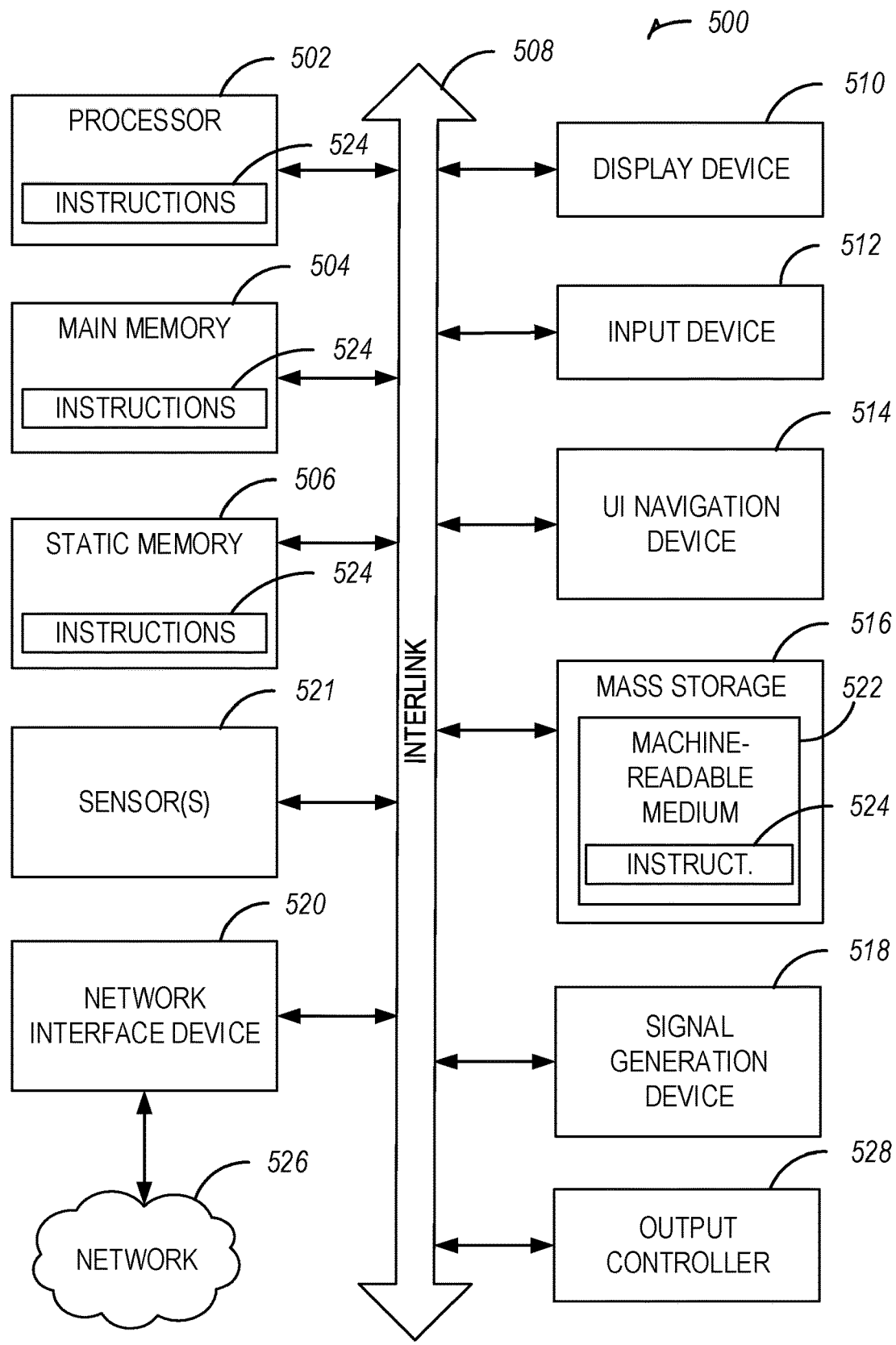
FIG. 5 is a block diagram illustrating an example of a machine upon which one or more embodiments may be implemented.

FIG. 5 illustrates a block diagram of an example machine 500 upon which any one or more of the techniques (e.g., methodologies) discussed herein may perform. In alternative embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in peer-to-peer (P2P) (or other distributed) network environment. The machine 500 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuit sets are a collection of circuits implemented in tangible entities that include hardware (e.g., simple circuits, gates, logic, etc.). Circuit set membership may be flexible over time and underlying hardware variability. Circuit sets include members that may, alone or in combination, perform specified operations when operating. In an example, hardware of the circuit set may be immutably designed to carry out a specific operation (e.g., hardwired). In an example, the hardware of the circuit set may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

Machine (e.g., computer system) 500 may include a hardware processor 502 (e.g., a central processing unit (CPU), a graphics processing unit (GPU), a hardware processor core, field programmable gate array (FPGA), or any combination thereof), a main memory 504 and a static memory 506, some or all of which may communicate with each other via an interlink (e.g., bus) 508. The machine 500 may further include a display unit 510, an alphanumeric input device 512 (e.g., a keyboard), and a user interface (UI) navigation device 514 (e.g., a mouse). In an example, the display unit 510, input device 512 and UI navigation device 514 may be a touch screen display. The machine 500 may additionally include a storage device (e.g., drive unit) 516, a signal generation device 518 (e.g., a speaker), a network interface device 520, and one or more sensors 521, such as a global positioning system (GPS) sensor, compass, accelerometer, or other sensor. The machine 500 may include an output controller 528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 516 may include a machine readable medium 522 on which is stored one or more sets of data structures or instructions 524 (e.g., software) embodying or used by any one or more of the techniques or functions described herein. The instructions 524 may also reside, completely or at least partially, within the main memory 504, within static memory 506, or within the hardware processor 502 during execution thereof by the machine 500. In an example, one or any combination of the hardware processor 502, the main memory 504, the static memory 506, or the storage device 516 may constitute machine readable media.

While the machine readable medium 522 is illustrated as a single medium, the term "machine readable medium" may include a single medium or multiple media (e.g., a centralized or distributed database, and/or associated caches and servers) configured to store the one or more instructions 524.

The term "machine readable medium" may include any medium that is capable of storing, encoding, or carrying instructions for execution by the machine 500 and that cause the machine 500 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine readable medium with a plurality of particles having invariant (e.g., rest) mass. Accordingly, massed machine-readable media are not transitory propagating signals. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 524 may further be transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 520 may include one or more physical jacks (e.g., Ethernet, coaxial, or phone jacks) or one or more antennas to connect to the communications network 526. In an example, the network interface device 520 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 500, and includes digital or analog communications signals or other intangible medium to facilitate communication of such software.

Example 1 is a system for data creation limits, comprising: at least one processor; and memory including instructions that, when executed by the at least one processor, cause the at least one processor to: receive data; split the data into a plurality of portions based on entity interests in each of the plurality of portions; generate respective tokens for each portion of the plurality of portions; assign an owner to a token of the respective tokens, the token corresponding to a portion of the plurality of portions and assigning the owner based on the owner having an entity interest in creation of the portion; generate a script, using the token, for access to the portion; and save the portion to memory, including the token using the script.

In Example 2, the subject matter of Example 1 includes, instructions to: receive a request for access to the portion; execute the script, wherein the script includes requesting the token; receive the token; and provide access to the portion based on the script identifying the token.

In Example 3, the subject matter of Example 2 includes, wherein the portion has a second owner.

In Example 4, the subject matter of Example 3 includes, instructions to: assign the second owner to a second token, the second token corresponding to the portion of the plurality of portions; and generate the script for access to the portion, wherein access to the portion is based on the script identifying the token and the second token.

In Example 5, the subject matter of Example 4 includes, instructions to: execute the script, wherein the script includes requesting the token and the second token; receive the token and the second token; and provide access to the portion based on the script identifying the token and the second token.

In Example 6, the subject matter of Examples 1-5 includes, instructions to: receive a request for verification of existence of the portion; provide a verification response for the portion; receive a request for availability of the portion; and provide an availability response for the portion, wherein availability is based on requirements of the script.

In Example 7, the subject matter of Examples 1-6 includes, wherein splitting the data into the plurality of portions is based on a set of rules.

In Example 8, the subject matter of Example 7 includes, wherein the set of rules indicate splitting the data based on access rights.

In Example 9, the subject matter of Examples 1-8 includes, wherein the plurality of portions are stored in a blockchain, the plurality of portions stored as a data structure including the data, the script, and the token.

In Example 10, the subject matter of Example 9 includes, wherein the plurality of portions are encrypted with a hash of the blockchain.

In Example 11, the subject matter of Examples 1-10 includes, wherein the plurality of portions are encrypted with a homomorphic encryption.

Example 12 is a computer-implemented method for data creation limits, comprising: receiving data; splitting the data into a plurality of portions based on entity interests in each of the plurality of portions; generating respective tokens for each portion of the plurality of portions; assigning an owner to a token of the respective tokens, the token corresponding to a portion of the plurality of portions and assigning the owner based on the owner having an entity interest in creation of the portion; generating a script, using the token, for access to the portion; and saving the portion to memory, including the token using the script.

In Example 13, the subject matter of Example 12 includes, receiving a request for access to the portion; executing the script, wherein the script includes requesting the token; receiving the token; and providing access to the portion based on the script identifying the token.

In Example 14, the subject matter of Example 13 includes, wherein the portion has a second owner.

In Example 15, the subject matter of Example 14 includes, assigning the second owner to a second token, the second token corresponding to the portion of the plurality of portions; and generating the script for access to the portion, wherein access to the portion is based on the script identifying the token and the second token.

In Example 16, the subject matter of Example 15 includes, executing the script, wherein the script includes requesting the token and the second token; receiving the token and the second token; and providing access to the portion based on the script identifying the token and the second token.

Example 17 is at least one non-transitory machine-readable medium including instructions for data creation limits that, when executed by at least one processor, cause the at least one processor to perform operations to: receive data; split the data into a plurality of portions based on entity interests in each of the plurality of portions; generate respective tokens for each portion of the plurality of portions; assign an owner to a token of the respective tokens, the token corresponding to a portion of the plurality of portions and assigning the owner based on the owner having an entity interest in creation of the portion; generate a script, using the token, for access to the portion; and save the portion to memory, including the token using the script.

In Example 18, the subject matter of Example 17 includes, instructions to: receive a request for access to the portion; execute the script, wherein the script includes requesting the token; receive the token; and provide access to the portion based on the script identifying the token.

In Example 19, the subject matter of Example 18 includes, wherein the portion has a second owner.

In Example 20, the subject matter of Example 19 includes, instructions to: assign the second owner to a second token, the second token corresponding to the portion of the plurality of portions; and generate the script for access to the portion, wherein access to the portion is based on the script identifying the token and the second token.

In Example 21, the subject matter of Example 20 includes, instructions to: execute the script, wherein the script includes requesting the token and the second token; receive the token and the second token; and provide access to the portion based on the script identifying the token and the second token.

Example 22 is at least one machine-readable medium including instructions that, when executed by processing circuitry, cause the processing circuitry to perform operations to implement of any of Examples 1-21.

Example 23 is an apparatus comprising means to implement of any of Examples 1-21.

Example 24 is a system to implement of any of Examples 1-21.

Example 25 is a method to implement of any of Examples 1-21.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A system for data creation limits, comprising: at least one processor; and memory including instructions that, when executed by the at least one processor, cause the at least one processor to: receive data; split the data into a plurality of portions based on entity interests in each of the plurality of portions and further based on a set of rules; generate respective tokens for each portion of the plurality of portions; assign an owner to a token of the respective tokens, the token corresponding to a portion of the plurality of portions and assigning the owner based on the owner having an entity interest in creation of the portion; generate a script, using the token, for access to the portion; save the portion to memory, including the token using the script;

receive a request for verification of existence of the portion; provide a verification response for the portion; receive a request for availability of the portion; provide an availability response for the portion, wherein availability is based on requirements of the script.

2. The system of claim 1, further including instructions to:
receive a request for access to the portion;
execute the script, wherein the script includes requesting the token;
receive the token; and
provide access to the portion based on the script identifying the token.

3. The system of claim 2, wherein the portion has a second owner.

4. The system of claim 3, further including instructions to:
assign the second owner to a second token, the second token corresponding to the portion of the plurality of portions; and
generate the script for access to the portion, wherein access to the portion is based on the script identifying the token and the second token.

5. The system of claim 4, further including instructions to:
execute the script, wherein the script includes requesting the token and the second token;
receive the token and the second token; and
provide access to the portion based on the script identifying the token and the second token.

6. The system of claim 1, wherein the set of rules indicate splitting the data based on access rights.

7. The system of claim 1, wherein the plurality of portions are stored in a blockchain, the plurality of portions stored as a data structure including the data, the script, and the token.

8. The system of claim 7, wherein the plurality of portions are encrypted with a hash of the blockchain.

9. The system of claim 1, wherein the plurality of portions are encrypted with a homomorphic encryption.

10. A computer-implemented method for data creation limits, comprising: receiving data; splitting the data into a plurality of portions based on entity interests in each of the plurality of portions and further based on a set of rules wherein the set of rules indicate splitting the data based on access rights; generating respective tokens for each portion of the plurality of portions; assigning an owner to a token of the respective tokens, the token corresponding to a portion of the plurality of portions and assigning the owner based on the owner having an entity interest in creation of the portion; generating a script, using the token, for access to the portion; saving the portion to memory, including the token using the script;
receive a request for verification of existence of the portion; provide a verification response for the portion; receive a request for availability of the portion; and provide an availability response for the portion, wherein availability is based on requirements of the script.

11. The computer-implemented method of claim 10, further comprising:
receiving a request for access to the portion;
executing the script, wherein the script includes requesting the token;
receiving the token; and
providing access to the portion based on the script identifying the token.

12. The computer-implemented method of claim 11, wherein the portion has a second owner.

13. The computer-implemented method of claim 12, further comprising:
assigning the second owner to a second token; the second token corresponding to the portion of the plurality of portions; and
generating the script for access to the portion; wherein access to the portion is based on the script identifying the token and the second token.

14. The computer-implemented method of claim 13, further comprising:
executing the script, wherein the script includes requesting the token and the second token;
receiving the token and the second token; and
providing access to the portion based on the script identifying the token and the second token.

15. At least one non-transitory machine-readable medium including instructions for data creation limits that, when executed by at least one processor, cause the at least one processor to perform operations to: receive data; split the data into a plurality of portions based on entity interests in each of the plurality of portions and further based on a set of rules, wherein the set of rules indicate splitting the data based on access rights; generate respective tokens for each portion of the plurality of portions; assign an owner to a token of the respective tokens, the token corresponding to a portion of the plurality of portions and assigning the owner based on the owner having an entity interest in creation of the portion; generate a script, using the token, for access to the portion; save the portion to memory, including the token using the script;
receive a request for verification of existence of the portion; provide a verification response for the portion; receive a request for availability of the portion; and provide an availability response for the portion, wherein availability is based on requirements of the script.

16. The at least one non-transitory machine-readable medium of claim 15, further including instructions to:
receive a request for access to the portion;
execute the script, wherein the script includes requesting the token;
receive the token; and
provide access to the portion based on the script identifying the token.

17. The at least one non-transitory machine-readable medium of claim 16, wherein the portion has a second owner.

18. The at least one non-transitory machine-readable medium of claim 17, further including instructions to:
assign the second owner to a second token, the second token corresponding to the portion of the plurality of portions; and
generate the script for access to the portion, wherein access to the portion is based on the script identifying the token and the second token.

19. The at least one non-transitory machine-readable medium of claim 18, further including instructions to:
execute the script, wherein the script includes requesting the token and the second token;
receive the token and the second token; and
provide access to the portion based on the script identifying the token and the second token.

* * * * *

UNITED STATES PATENT AND TRADEMARK OFFICE
CERTIFICATE OF CORRECTION

PATENT NO. : 11,539,523 B1  
APPLICATION NO. : 16/935624  
DATED : December 27, 2022  
INVENTOR(S) : Miranda et al.

Page 1 of 2

It is certified that error appears in the above-identified patent and that said Letters Patent is hereby corrected as shown below:

On the Title Page

Item (72), in "Inventors", in Column 1, Line 3, delete "Freemont," and insert --Fremont,-- therefor In the Claims In Column 14, Line 55, in Claim 1, after "comprising:", insert a linebreak In Column 14, Line 56, in Claim 1, after "and", insert a linebreak In Column 14, Line 58, in Claim 1, after "to:", insert a linebreak In Column 14, Line 58, in Claim 1, after "data;", insert a linebreak In Column 14, Line 60, in Claim 1, after "rules;", insert a linebreak In Column 14, Line 62, in Claim 1, after "portions;", insert a linebreak In Column 14, Line 65, in Claim 1, after "portion;", insert a linebreak In Column 14, Line 66, in Claim 1, after "portion;", insert a linebreak In Column 15, Line 2 (First Occurrence), in Claim 1, after "portion;", insert a linebreak In Column 15, Line 2 (Second Occurrence), in Claim 1, after "portion;", insert a linebreak In Column 15, Line 3, in Claim 1, after "portion;", insert --and--

In Column 15, Line 38, in Claim 10, after "comprising:", insert a linebreak

Signed and Sealed this  
Fourth Day of April, 2023

Katherine Kelly Vidal  
*Director of the United States Patent and Trademark Office*

CERTIFICATE OF CORRECTION (continued)
U.S. Pat. No. 11,539,523 B1

In Column 15, Line 38, in Claim 10, after "data;", insert a linebreak

In Column 15, Line 42, in Claim 10, after "rights;", insert a linebreak

In Column 15, Line 43, in Claim 10, after "portions;", insert a linebreak

In Column 15, Line 46, in Claim 10, after "portion;", insert a linebreak

In Column 15, Line 47, in Claim 10, after "portion;", insert a linebreak

In Column 15, Line 51 (First Occurrence), in Claim 10, after "portion;", insert a linebreak In Column 15, Line 51 (Second Occurrence), in Claim 10, after "portion;", insert a linebreak In Column 16, Line 3, in Claim 13, delete "token;" and insert --token,-- therefor In Column 16, Line 6, in Claim 13, delete "portion;" and insert --portion,-- therefor In Column 16, Line 20, in Claim 15, after "to:", insert a linebreak In Column 16, Line 20, in Claim 15, after "data;", insert a linebreak In Column 16, Line 24, in Claim 15, after "rights;", insert a linebreak In Column 16, Line 25, in Claim 15, after "portions;", insert a linebreak In Column 16, Line 29, in Claim 15, after "portion;", insert a linebreak In Column 16, Line 30, in Claim 15, after "portion;", insert a linebreak In Column 16, Line 33 (First Occurrence), in Claim 15, after "portion;", insert a linebreak In Column 16, Line 33 (Second Occurrence), in Claim 15, after "portion;", insert a linebreak